(12) United States Patent
Bohrer et al.

(10) Patent No.: US 8,370,517 B2
(45) Date of Patent: Feb. 5, 2013

(54) CONSERVING ENERGY IN A DATA PROCESSING NETWORK

(75) Inventors: Patrick Joseph Bohrer, Austin, TX (US); Bishop Chapman Brock, Coupland, TX (US); Elmootazbellah Nabil Elnozahy, Austin, TX (US); Ramakrishnan Rajamony, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1710 days.

(21) Appl. No.: 09/965,013

(22) Filed: Sep. 27, 2001

(65) Prior Publication Data

US 2003/0074464 A1    Apr. 17, 2003

(51) Int. Cl.
*G06F 15/16* (2006.01)
(52) U.S. Cl. ....................................................... 709/232
(58) Field of Classification Search .......... 709/227–228, 709/241, 221–222, 223–224, 233, 220, 226, 709/230, 232, 237; 370/468–469, 903, 230; 379/93.08; 710/29
See application file for complete search history.

(56) References Cited

U.S. PATENT DOCUMENTS

| | | | | |
|---|---|---|---|---|
| 5,495,205 A * | 2/1996 | Parker et al. | ................... | 331/1 A |
| 6,014,694 A * | 1/2000 | Aharoni et al. | ............... | 709/219 |
| 6,377,552 B1 * | 4/2002 | Moran et al. | ................... | 370/241 |
| 6,535,551 B1 * | 3/2003 | Sweitzer et al. | ............. | 375/225 |
| 6,538,994 B1 * | 3/2003 | Horspool et al. | ............ | 370/230 |
| 6,661,803 B1 * | 12/2003 | Choi et al. | .................... | 370/413 |
| 6,721,795 B1 * | 4/2004 | Eldreth | ......................... | 709/232 |
| 6,738,348 B1 * | 5/2004 | Rollins | ......................... | 370/230 |
| 6,754,228 B1 * | 6/2004 | Ludwig | ......................... | 370/468 |
| 6,791,974 B1 * | 9/2004 | Greenberg | ..................... | 370/352 |
| 6,876,668 B1 * | 4/2005 | Chawla et al. | ................ | 370/468 |
| 7,072,295 B1 * | 7/2006 | Benson et al. | ................ | 370/230 |
| 7,154,851 B1 * | 12/2006 | Fedyk et al. | .................. | 370/230 |
| 7,165,102 B2 * | 1/2007 | Shah et al. | ..................... | 709/223 |
| 7,215,678 B1 * | 5/2007 | Ahlfors et al. | ................ | 370/412 |
| 7,792,104 B2 * | 9/2010 | Tzeng | ............................ | 370/389 |
| 7,944,952 B2 * | 5/2011 | Smyers | ......................... | 370/536 |
| 2002/0044528 A1 * | 4/2002 | Pogrebinsky et al. | ........ | 370/230 |
| 2002/0085492 A1 * | 7/2002 | Mukai et al. | .................. | 370/230 |
| 2010/0020685 A1 * | 1/2010 | Short et al. | .................... | 370/230 |

FOREIGN PATENT DOCUMENTS

| | | |
|---|---|---|
| EP | 0939511 A | 1/1999 |
| JP | 2002-335262 | 11/2002 |
| JP | 2003-069607 | 3/2003 |

* cited by examiner

*Primary Examiner* — Douglas Blair
*Assistant Examiner* — Benjamin Ailes
(74) *Attorney, Agent, or Firm* — Yudell Isidore Ng Russell PLLC

(57) ABSTRACT

A data processing network and method for conserving energy in which an initial negotiation between a network server and a switch to which the server is connected is performed to establish an initial operating frequency of the server-switch link. An effective data rate of the server is determined based on network traffic at the server. Responsive to determining that the effective data rate is materially different than the current operating frequency, a subsequent negotiation is performed to establish a modified operating frequency where the modified operating frequency is closer to the effective data rate than the initial operating frequency. The determination of the effective date rate and the contingent initiation of a subsequent negotiation may be repeated periodically during the operating of the network. In one embodiment, the initial and subsequent negotiation are compliant with the IEEE 802.3 standard.

23 Claims, 3 Drawing Sheets

CONSERVING ENERGY IN A DATA PROCESSING NETWORK

BACKGROUND

1. Field of the Present Invention

The present invention generally relates to the field of network computing and more particularly to a method and system for reducing energy consumption in a server cluster by dynamically adjusting the operating frequency of selected server-network links.

2. History of Related Art

In the field of networked computing and data processing, server clusters are commonly used as a means of providing network services. A server cluster typically includes a set of server devices, each of which is capable of processing server requests. The cluster may include a request distributor that is configured to route incoming requests to an appropriate server in the server cluster for processing. Requests may be distributed to the individual servers based upon the current loading of the individual servers, the origin of the request, the location of the requested file or data, or other appropriate factors.

Server clusters are frequently arranged according to a switched configuration in which each server communicates with a central switch via a transmission medium such as twisted copper, fiber optic cable, or wirelessly transmitted electromagnetic waves. When the network parameters are configured, a transmission rate is established for each server-switch link based upon the bandwidth capabilities of the respective network interface cards and the transmission medium itself. Typically, the transmission rate for a given link is determined when the link is established and remains set during the link lifetime. Moreover, the transmission rate that is established is typically the highest possible transmission rate that both ends of the link can accommodate.

Maintaining the transmission rate of each network link at the highest possible value maximizes performance but only at the cost of increased power consumption. It is common knowledge that operating a network link at high frequency costs more than operating the same link at low frequency. Moreover, the additional cost incurred to operate the network links at high frequency often does not translate into correspondingly improved performance because the data transmission rate may be limited by factors other than the physical bandwidth of the link between the server and switch.

The sum of the bandwidth of the individual server-switch links cannot exceed the bandwidth allocated to the server cluster as a whole. Thus, if a server cluster having an allocated bandwidth of 200 Megabits/second (Mbps) is supporting a total of 20 servers, each connected to a central switch with a 100 Mbps link, it is physically impossible for all of the links to operate at their maximum bandwidth simultaneously. Moreover, the connection between a remote client and the server cluster may represent a limit on the usable bandwidth of the server-switch link. If a client connects to the server cluster (and an individual server) over a 56 Kbps modem connection during a period when there is no other network traffic, the maximum bandwidth of the server-switch link that can be utilized to service the client request is 56 K. If the server-switch link is operating at 100 Mbps as an example, the bandwidth will be severely underutilized. It would therefore, be desirable to implement a method and system for dynamically conserve energy consumption in a data processing network by dynamically optimizing the operating frequencies of the server links in response to changing network conditions.

SUMMARY OF THE INVENTION

The problems identified above are in large part addressed by a data processing network and method in which the operating frequency of network links is adjusted dynamically to conserve energy consumption with a minimum of performance loss. When the maximum usable bandwidth of a server's network link is less than the current operating frequency of the link, the operating frequency of the server link is reduced. Similarly, if the maximum usable bandwidth of the link exceeds the current operating frequency, the operating frequency may be increased. In one embodiment, the data processing network includes a server cluster in which a set of server devices are connected to a central switch. The individual server-switch links may comply with an industry standard network configuration protocol such as Ethernet. Initially, the server-switch links may be established at the link's maximum operating frequency according to a negotiation process specified in a protocol such as IEEE 802.3. Periodically, thereafter, the server may determine that the current operating frequency of its link exceeds the capacity required to service client requests while maintaining a desired level of performance. The server (or the switch) may then adjust the bandwidth of its link to operate at the lowest possible operating frequency required to accommodate the current loading. In this manner, the data processing network reduces power consumption by minimizing the operating frequency of its individual server links.

BRIEF DESCRIPTION OF THE DRAWINGS

Other objects and advantages of the invention will become apparent upon reading the following detailed description and upon reference to the accompanying drawings in which.

Figure 1:
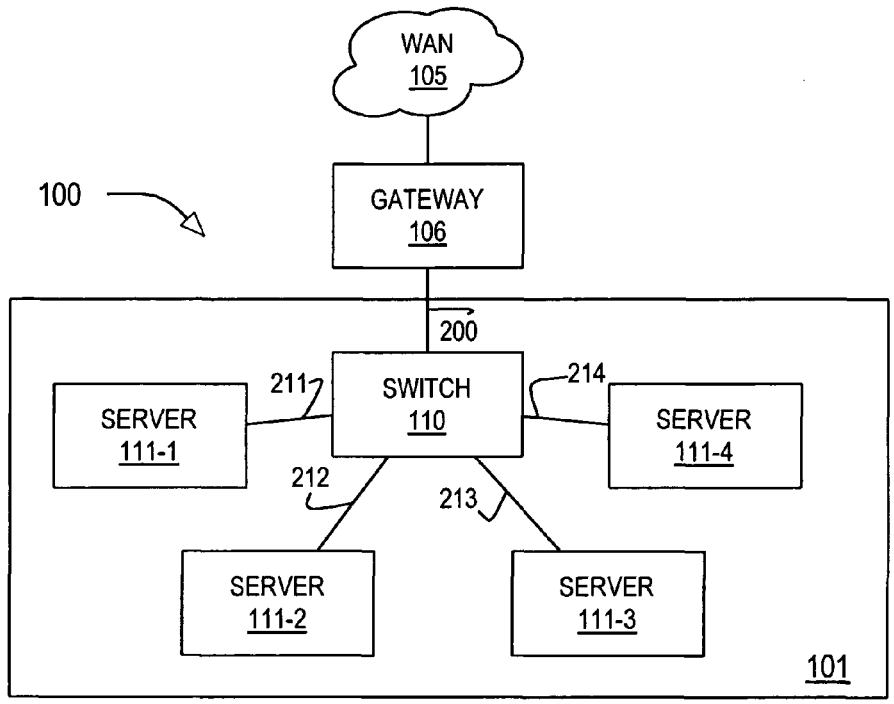
FIG. 1 is a block diagram illustrating selected features of a data processing network.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of selected features of a data processing network 100 according to one embodiment of the present invention. In the depicted embodiment, data processing network 100 includes a server cluster 101 that is connected to a wide area network (WAN) 105 through an intermediate gateway 106. WAN 105 may include a multitude of various network devices including gateways, routers, hubs, and so forth as well as one or more local area networks (LANs) all interconnected over a potentially wide-spread geographic area. WAN 105 may represent the Internet in one embodiment.

Server cluster 101 as depicted includes a central switch 110 that is connected to the gateway 106 via a network link 200. Cluster 101 further includes a plurality of servers, four of which are depicted in FIG. 1 and indicated by reference numerals 111-1, 111-2, 111-3, and 111-4. Each server 111 is connected to switch 110 via a dedicated network link (reference numerals 211, 212, 213, and 214).

Server cluster 101 may service all requests to a single universal resource indicator (URI) on network 100. In this embodiment, client requests to the URI originating from anywhere within WAN 105 are routed to server cluster 101. Switch 110 typically includes a request distributor software module that is responsible for routing client requests to one of the servers 111 in cluster 101. The request distributor may incorporate any of a variety of distribution algorithms or processes to optimize the server cluster performance, minimize energy consumption, or achieve some other goal. Switch 110 may, for example, route requests to a server 111 based on factors such as the current loading of each server 111, the source of the client request, the requested content, or a combination thereof.

Figure 2:
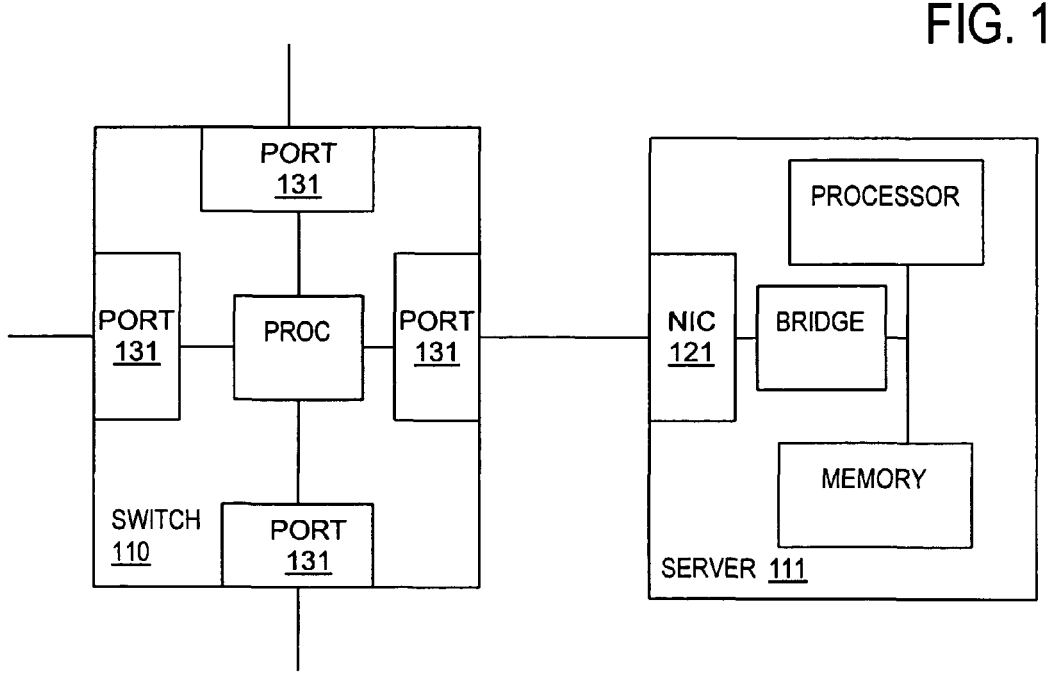
FIG. 2 is a block diagram illustrating additional detail of the data processing network of FIG. 1.

In one embodiment, network links 211, 212, 213, and 214 utilize the Ethernet protocol. In this embodiment, each server 111 includes an Ethernet compliant network interface card and switch 110 includes an Ethernet compliant port for each server 111. Referring to FIG. 2, a block diagram illustrating additional detail of a switch 110 and one of the servers 111 is presented. Each server 111 includes a NIC 121 that connects to a corresponding port 131 in switch 110. In one embodiment suitable for use in the present invention, NIC 121 and each port 131 of switch 110 are capable of operating at various operating frequencies. In one embodiment, for example, NIC 121 and its corresponding port 131 are capable of supporting Ethernet links operating at 10 Mbps, 100 Mbps, and 1000 Mbps. Commercially available switches with such capability are represented by, for example, the 180 series of content-intelligent web switches from Alteon Web Systems (www.alteonwebsystems.com). Similarly, network interface cards such as the 10/100/1000 PCI-X Server NIC from 3Com may provide the ability to operate at different operating frequencies.

Servers 111 and switch 110 are configured to engage in a negotiation process to arrive at and agree upon an operating frequency for the corresponding link between them. In a conventional server cluster configuration, this negotiation is performed only during link initialization and the negotiation outcome, including the link's operating frequency, remains constant as long as the link is present. Moreover, the operating frequency that the negotiation produces is typically the maximum operating frequency that the switch, server, and interconnecting medium can accommodate. The present invention contemplates a system and method for periodically modifying the operating frequencies of the various server-switch links in response to changing server cluster conditions to achieve a desirable level of cluster response performance while reducing the operating cost of the server cluster.

Figure 3:
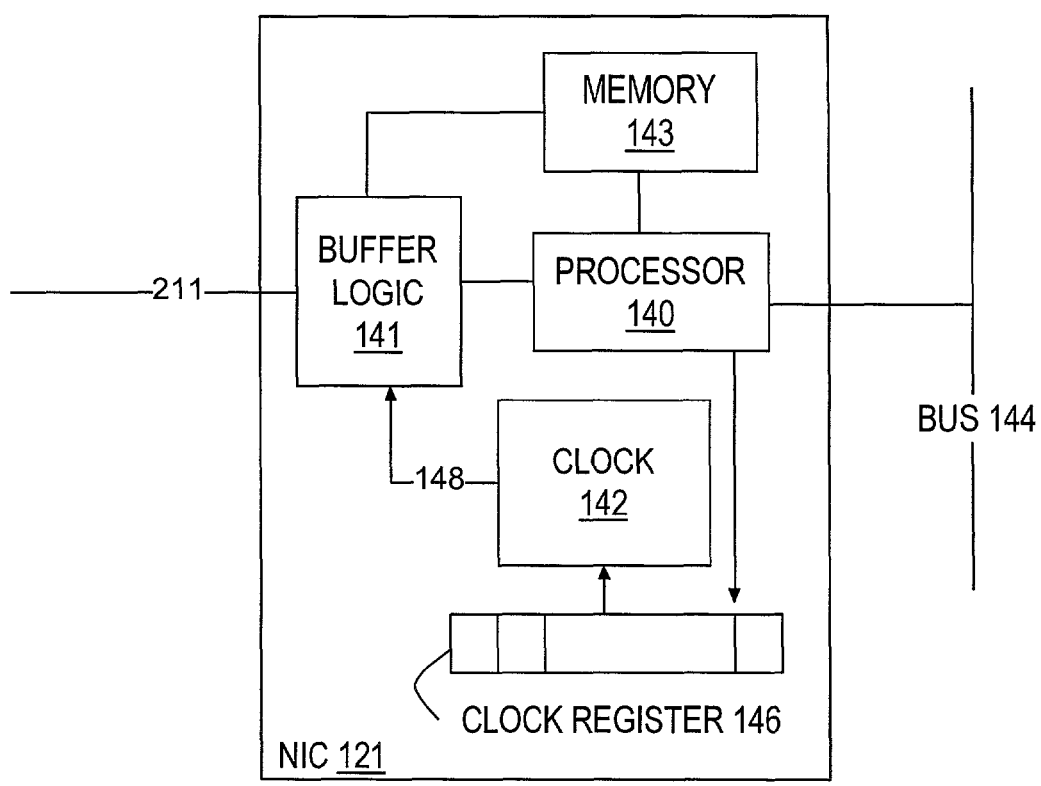
FIG. 3 is a block diagram illustrating additional detail of the network interface card of FIG. 2.

Turning now to FIG. 3, a block diagram illustrating additional detail of a NIC 121 suitable for use in the present invention is depicted. The depicted embodiment of NIC 121 includes an embedded processor 140 that interfaces to a peripheral bus or local bus 144 of server 111. Bus 144 is typically implemented according to an industry standard bus protocol such as the Peripheral Components Interface (PCI) local bus as specified in PCI Local Bus Specification 2.2 from the PCI Special Interest Group (www.pcisig.com). NIC 121 further includes buffer logic 141 connected to processor 140 that provides temporary storage for information received from and transmitted to network link 211.

A clock generator 142 provides the basic clocking signal 148 that drives buffer logic 141 and thereby establishes the operating frequency of network link 211. In the depicted embodiment, clock generator 142 is capable of providing clocking signal 148 at various frequencies controlled by the settings in a clock register 146. Clock register 146 is under the programmable control of processor 140. A memory 143 is accessible to processor 140 and buffer logic 141. Memory 140 may include volatile storage such as a conventional dynamic or static random access memory (DRAM or SRAM) array as well as persistent or non-volatile storage such as a flash memory card or other form of electrically erasable programmable read only memory (EEPROM).

Portions of the present invention may be implemented as a computer program product comprising a set of computer executable instructions stored on a computer readable medium. The computer readable medium in which the instructions are stored may include the volatile or non-volatile elements of memory 143. Alternatively, the instructions may be stored on a floppy diskette, hard disk, CD ROM, DVD, magnetic tape, or other suitable persistent storage facility.

NIC 121 includes software configured to perform a negotiation with switch 110 via the corresponding network link to establish the link's operating frequency. In an Ethernet embodiment of server cluster 101, the negotiation process software is typically compliant with the IEEE 802.3 standard, which is incorporated by reference herein. Ethernet compliant NIC's and switches typically include code that establishes the operating frequency of the network link. As indicated previously, this code is executed only when the link is established in a conventional server. NIC 121 and its corresponding port 131 according to the present invention, however, are both configured to invoke this negotiation process code periodically to modify the link operating frequency in response to changing conditions in the bandwidth utilization of the link.

Figure 4:
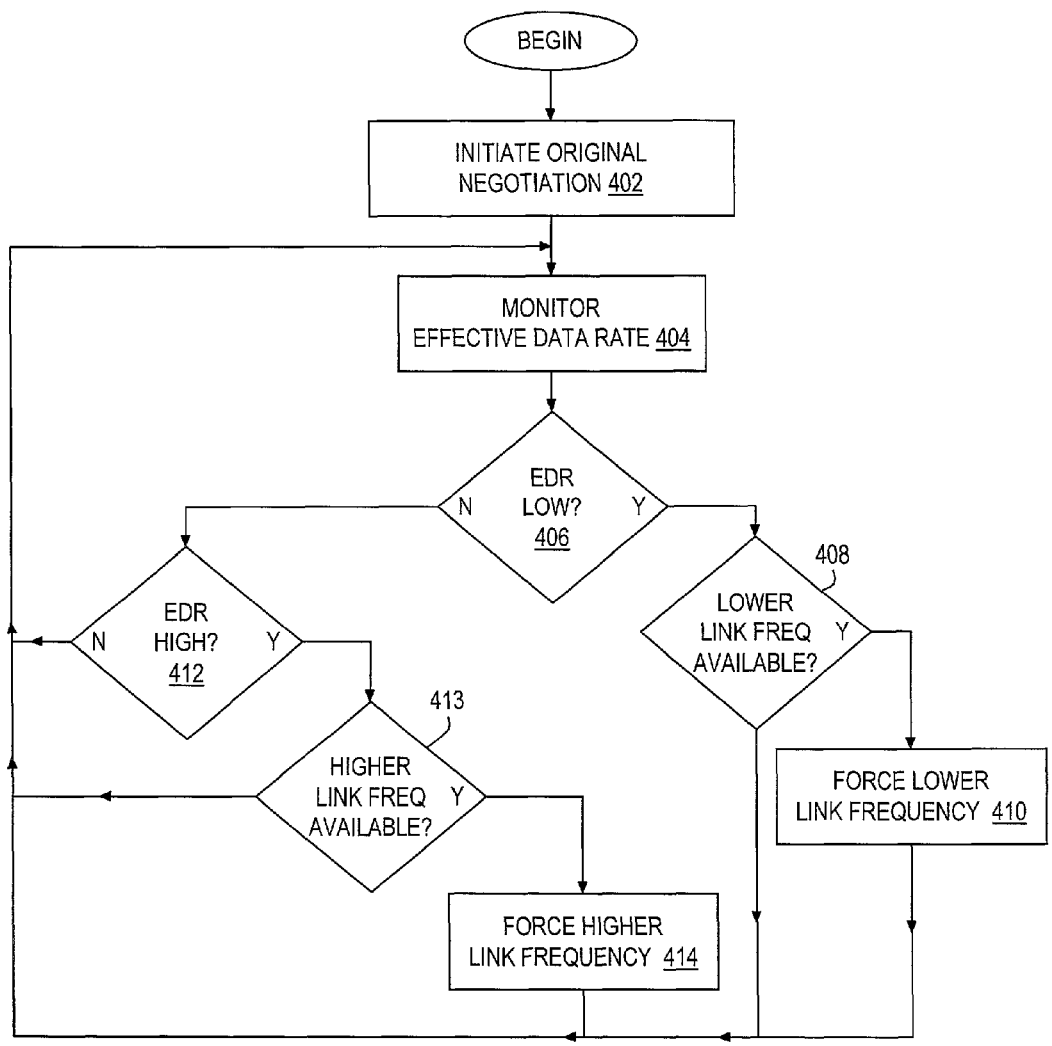
FIG. 4 is a flow diagram illustrating operation of a server in the data processing network of FIG. 1.

Referring to FIG. 4, a flow diagram illustrating a method of controlling the operating frequency of various links in a data processing network such as server cluster 101 is presented. When a server-switch link is first established, NIC 121 will initiate (block 402) a negotiation referred to herein as the original negotiation. Typically, the original negotiation establishes the maximum link operating frequency that the components can accommodate. Thereafter, NIC 121 monitors (block 404) the utilization of the network link between itself and its corresponding port. NIC 121 is configured to recognize periods of significant under-utilization of the server-switch bandwidth and to adjust the operating frequency of the link accordingly.

The link utilization monitored by NIC 121 represents the rate at which data is transmitted and/or received over the link. This utilization may be determined using a relatively simple link level routine in which a link utilization factor (also referred to herein as an effective data rate) is determined periodically. The routine would typically determine the volume of traffic transmitted and/or received over the link during a specified time period using an accumulator or other suitable mechanism. The specified time period may coincide with the periodic rate at which the link operating frequency is updated. If, for example, the link operating frequencies are to be modified, if needed, every ten minutes, the utilization factor may be determined by accumulating the number of bytes of link traffic over a ten minute period and dividing by 600 seconds to obtain a utilization rate in terms of bytes per second. The periodic intervals at which the link operating frequency is modified is preferably under the programmable control of switch 110 or server 111 such that the specified time period may be altered.

The effective transmission rate may be substantially less than the operating frequency of the network link. The bandwidth of the switch-gateway link 200 provides an upper limit on the sum of the bandwidths of the individual server-switch links 211, 212, etc. The bandwidth needed for any individual server-switch link cannot exceed the bandwidth allocated to switch-gateway link 200. Moreover, the effective data transmission rate of any server-switch link is a function of the client-side bandwidth. During times of reduced activity or network traffic, a server 111 may be servicing requests from a limited number of clients many of whom may have significant bandwidth limitations. If a server 111 is servicing requests from a single client that is connected to WAN 105 via a conventional modem connection, the effective data rate required of the server is orders of magnitude below the maximum switches maximum capacity. Under such circumstances, the high cost of maintaining a server-switch link at a high operating frequency does not provide any performance benefit since the performance is limited at the client side.

NIC 121 is configured to compare the effective data rate of its network link with the current operating frequency of the link. If the effective data rate (EDR) is materially different than the current link operating frequency, link operating frequency is modified such that the modified frequency is closer to the EDR than the previous operating frequency. If the EDR is determined in block 406 to be substantially lower than the link operating frequency, NIC 121 then determines in block 408 if the link is capable of operating at a lower operating frequency. As discussed previously, NIC 121 and its corresponding switch port are preferably capable of operating at one of multiple operating frequencies. If NIC 121 is not currently operating at its lowest frequency and its effective data rate is substantially below the current operating frequency, NIC 121 is configured to initiate a negotiation with switch 110 that forces (block 410) the link to operate at a lower operating frequency.

In an embodiment where the server-switch links are Ethernet links, NIC 121 may leverage large portions of the standard IEEE 802.3 negotiation protocol to achieve the modification of the operating frequency. Instead of attempting to establish the highest operating frequency accommodated by the link components, the negotiation that occurs in block 410 (referred to as a modification negotiation) responsive to determining that the data rate is well below the operating frequency attempts to achieve an operating frequency that is the lowest possible operating frequency consistent with the most recently determined effective data rate. Thus, NIC 121 may initially indicate a desired operating frequency to switch 110 during the modification negotiation. If switch 110 is capable of operating at the NIC's desired operating frequency, that frequency will become the operating frequency of the link. If switch cannot accommodate the NIC's desired operating frequency, the negotiation process will resolve the lowest operating frequency accommodated by the link.

The modification negotiations preferably occur at a frequency that is sufficient to adjust to changing loading conditions but not so frequently as to impact performance negatively from excessive negotiation processing. Since, the length of an IEEE 802.3 standard negotiation is on the order of milliseconds, initiating a negotiation even as frequently as every minute should not impose a substantial burden on performance while providing sufficiently frequent modifications to accommodate changes in loading relatively quickly.

In addition to being able to reduce link operating frequency in response to a relatively low level of bandwidth utilization, server cluster 101 is configured to increase link operating frequency in response to relatively high bandwidth utilization. If the server determines in block 406 that the effective data rate is not less than some specified value or some specified ratio of the link's current bandwidth capacity, it may then determine (block 412) whether the effective data rate is above some specified ratio of the link bandwidth capacity. If the effective data rate is more than 90%, for example, of the link's bandwidth capacity, the server may then attempt to increase (block 414) the link operating frequency in a manner analogous to the manner in which the operating frequency is reduced in blocks 408 and 410 as described above. Thus, the server could determine (block 413) whether a higher operating frequency is available and, if so, initiate a modification negotiation to force (block 414) an increased operating frequency. After an increase (or decrease) in operating frequency, server 111 resumes operating and continues to monitor link bandwidth utilization for subsequent changes. In this manner, server 111 is constantly adjusting the link operating frequency to the minimum value required to achieve a desired level of performance thereby reducing energy consumption and heat dissipation characteristic of higher operating frequencies.

It will be apparent to those skilled in the art having the benefit of this disclosure that the present invention contemplates a system and method for conserving energy in a server cluster environment by optimizing the operating frequency of the network links to reflect the current loading. It is understood that the form of the invention shown and described in the detailed description and the drawings are to be taken merely as presently preferred examples. It is intended that the following claims be interpreted broadly to embrace all the variations of the preferred embodiments disclosed

The invention claimed is:

1. A method of operating a data processing network, the method comprising:
    performing an initial link layer operating frequency negotiation between a server and a switch to which the server is connected, wherein the initial link layer operating frequency negotiation establishes an initial total bandwidth capacity of a network link between the server and the switch at an initial operating frequency of the network link;
    following the initial link layer operating frequency negotiation, the server communicating network traffic with the switch over the network link and measuring an effective data rate of the network traffic communicated between the server and the switch over the network link; and
    responsive to determining by the measuring that the effective data rate is materially less than the initial total bandwidth capacity of the network link operating at the initial operating frequency, performing a subsequent link layer operating frequency negotiation to establish a decreased total bandwidth capacity of the network link at a decreased operating frequency of the network link, wherein the decreased operating frequency is closer to the measured effective data rate than the initial operating frequency.

2. The method of claim 1, wherein the initial and subsequent link layer operating frequency negotiations are compliant with the IEEE 802.3 standard.

3. The method of claim 1, wherein measuring the effective data rate includes accumulating information indicative of an amount of network traffic over the link during a specified interval and calculating the effective data rate based thereon.

4. The method of claim 1, wherein the method further comprises:
responsive to determining that the effective data rate is greater than a specified percentage of the initial total bandwidth capacity of the link, performing a subsequent link layer operating frequency negotiation to establish an increased total bandwidth capacity of the network link at an increased operating frequency of the link, wherein the increased operating frequency is higher than the initial operating frequency.

5. The method of claim 1, wherein the decreased operating frequency is a lowest operating frequency of the network link accommodated by the server and switch that is sufficient to handle the effective data rate.

6. The method of claim 1, and further comprising:
automatically repeating, at specified intervals during the operation of the data processing network, the measuring of the effective data rate and contingent initiation of a subsequent link layer operating frequency negotiation to automatically and periodically modify the operating frequency of the network link to a lowest operating frequency compatible with the effective data rate.

7. The method of claim 1, and further comprising:
in response to performing the subsequent link layer operating frequency negotiation, decreasing an operating frequency and power consumption of a network interface of the server.

8. A data processing system, comprising:
a processor, memory, and a network interface connected to a switch via a network link;
wherein the network interface performs an initial link layer operating frequency negotiation with the switch that establishes an initial total bandwidth capacity of the network link at an initial operating frequency of the network link and thereafter communicates network traffic with the switch over the network link and measures an effective data rate of the network traffic communicated between the data processing system and the switch over the network link; and
wherein the network interface performs a subsequent link layer operating frequency negotiation to establish a decreased total bandwidth capacity of the network link at a decreased operating frequency of the network link responsive to determining by measurement that the effective data rate is materially less than the initial total bandwidth capacity of the network link operating at the initial operating frequency, wherein the decreased operating frequency is closer to the measured effective data rate than the initial operating frequency.

9. The data processing system of claim 8, wherein the initial and subsequent link layer operating frequency negotiations are compliant with the IEEE 802.3 standard.

10. The data processing system of claim 8, wherein the network interface measures the effective data rate by accumulating information indicative of an amount of network traffic communicated with the switch via the network link during a specified interval and calculating the effective data rate based thereon.

11. The data processing system of claim 8, wherein:
the network interface performs a subsequent link layer operating frequency negotiation to establish an increased total bandwidth capacity of the network link at an increased operating frequency of the link responsive to determining that the effective data rate is greater than a specified percentage of the initial total bandwidth capacity of the link, wherein the increased operating frequency is higher than the initial operating frequency.

12. The data processing system of claim 8, wherein the initial and subsequent link layer operating frequency negotiations are initiated by the switch.

13. The data processing system of claim 8, wherein the initial and subsequent link layer operating frequency negotiations are initiated by the data processing system.

14. The data processing system of claim 8, wherein the decreased operating frequency is a lowest operating frequency of the network link accommodated by the server and switch that is sufficient to handle the effective data rate.

15. The data processing system of claim 8, wherein the network interface automatically repeats, at specified intervals during the operation of the network link, measurement of the effective data rate and contingent initiation of a subsequent link layer operating frequency negotiation to automatically and periodically modify the operating frequency of the network link to a lowest operating frequency compatible with the effective data rate.

16. The data processing system of claim 8, wherein the network interface, responsive to performing the subsequent link layer operating frequency negotiation, decreases its operating frequency and power consumption.

17. A data processing network, comprising:
a switch;
a network link; and
a data processing system comprising:
a processor, memory, and a network interface connected to the switch via the network link;
wherein the network interface performs an initial link layer operating frequency negotiation with the switch that establishes an initial total bandwidth capacity of the network link at an initial operating frequency of the network link and thereafter communicates network traffic with the switch over the network link and measures an effective data rate of the network traffic communicated between the data processing system and the switch over the network link; and
wherein the network interface performs a subsequent link layer operating frequency negotiation to establish a decreased total bandwidth capacity of the network link at a decreased operating frequency of the network link responsive to determining by measurement that the effective data rate is materially less than the initial total bandwidth capacity of the network link operating at the initial operating frequency, wherein the decreased operating frequency is closer to the measured effective data rate than the initial operating frequency.

18. A computer program product comprising:
a tangible computer-readable storage device;
machine-executable instructions, stored on the tangible computer-readable storage device, for conserving energy in a data processing network having a switch, a server, and a network link connecting the switch to the server, wherein the instructions when executed cause a machine to perform:
performing an initial link layer operating frequency negotiation between the server and the switch, wherein the initial link layer operating frequency negotiation establishes an initial total bandwidth capacity of a network link at an initial operating frequency of the network link;
thereafter detecting whether or not the network link is underutilized by:

measuring an effective data rate of network traffic communicated between the server and the switch over the network link; and determining, responsive to the measuring, whether or not the effective data rate is materially less than the initial total bandwidth capacity of the network link;

responsive to detecting that the link is underutilized because the effective data rate is materially less than the initial total bandwidth capacity of the network link operating at the initial operating frequency, performing a subsequent link layer operating frequency negotiation to establish a decreased total bandwidth capacity of the network link at a decreased operating frequency of the network link, wherein the decreased operating frequency is closer to the measured effective data rate than the initial operating frequency.

19. The computer program product of claim 18, wherein measuring the effective data rate includes determining an amount of network traffic traversing the network link during a specified interval.

20. The computer program product of claim 19, wherein the instructions further cause the machine to perform:

determining whether or not the network link is over-utilized by detecting whether the effective data rate is greater than a specified percentage of the initial total bandwidth capacity of the link; and responsive to detecting that the link is over-utilized because the effective data rate is greater than a specified percentage of the initial total bandwidth capacity of the link, performing a subsequent link layer operating frequency negotiation to establish an increased total bandwidth capacity of the network link at an increased operating frequency of the link, wherein the increased operating frequency is higher than the initial operating frequency.

21. The program product of claim 18, wherein the reduced operating frequency is a lowest operating frequency of the network link accommodated by the server and switch that is sufficient to handle the effective data rate.

22. The program product of claim 18, wherein the instructions further cause the machine to perform:

automatically repeating, at specified intervals during the operation of the network link, measurement of the effective data rate and contingent initiation of a subsequent link layer operating frequency negotiation to automatically modify the operating frequency of the network link to a lowest operating frequency compatible with the effective data rate.

23. The program product of claim 18, wherein the instructions further cause the machine to perform:

responsive to performance of the subsequent link layer operating frequency negotiation, decreasing an operating frequency and power consumption of a network interface of the server.

* * * * *